H. T. INGHRAM.
MANURE SPREADER.
APPLICATION FILED MAY 12, 1908.
991,065.
Patented May 2, 1911.
3 SHEETS—SHEET 3.
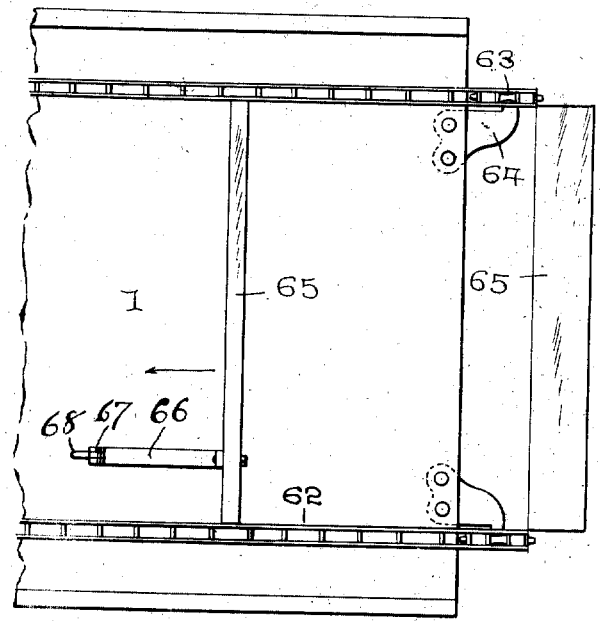
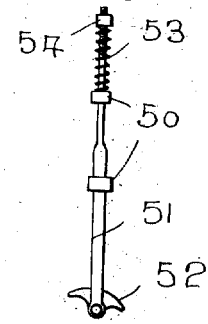
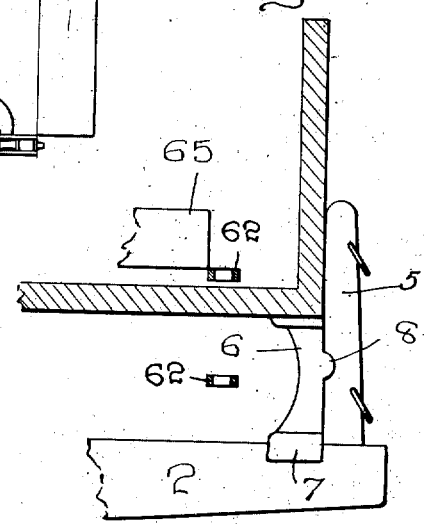
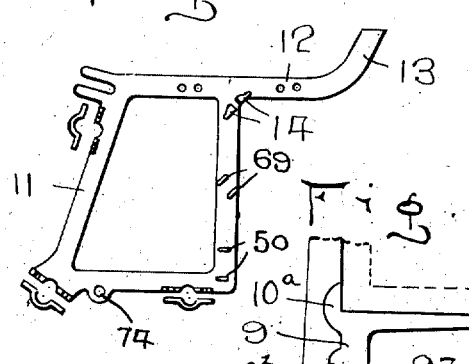
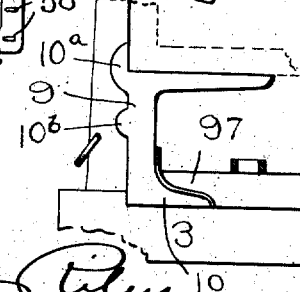
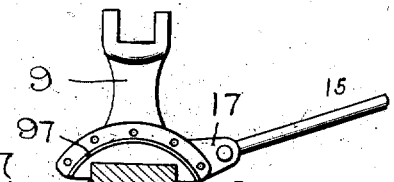
WITNESSES.
Thos. W. Riley
W. E. Lawson
INVENTOR
H. T. Inghram
BY
W. J. FitzGerald
Attorneys

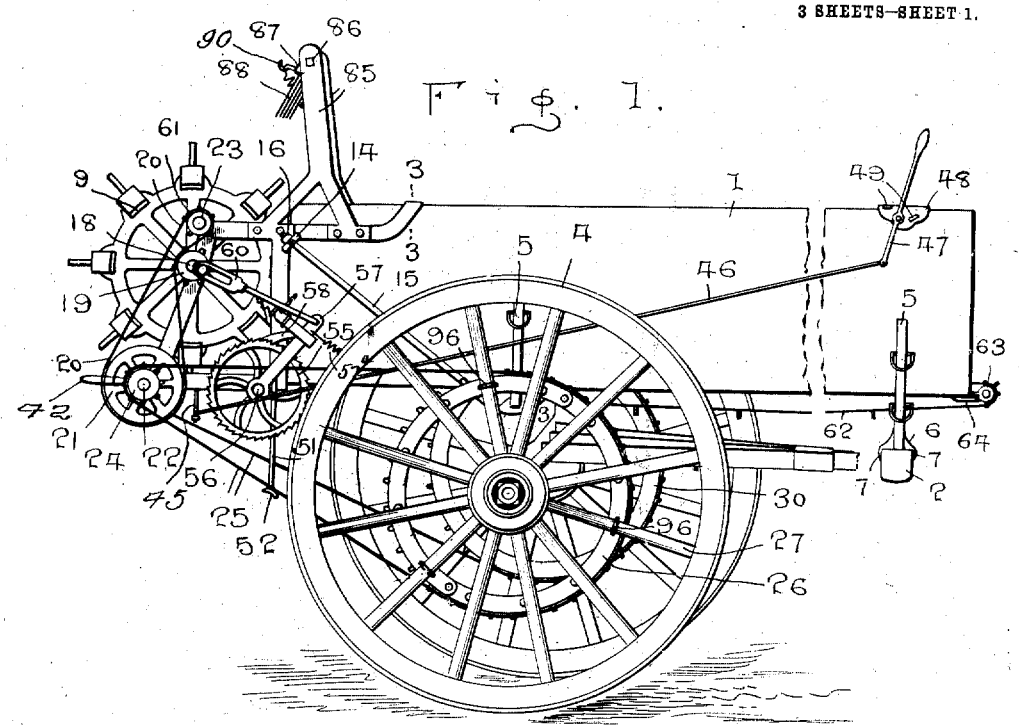

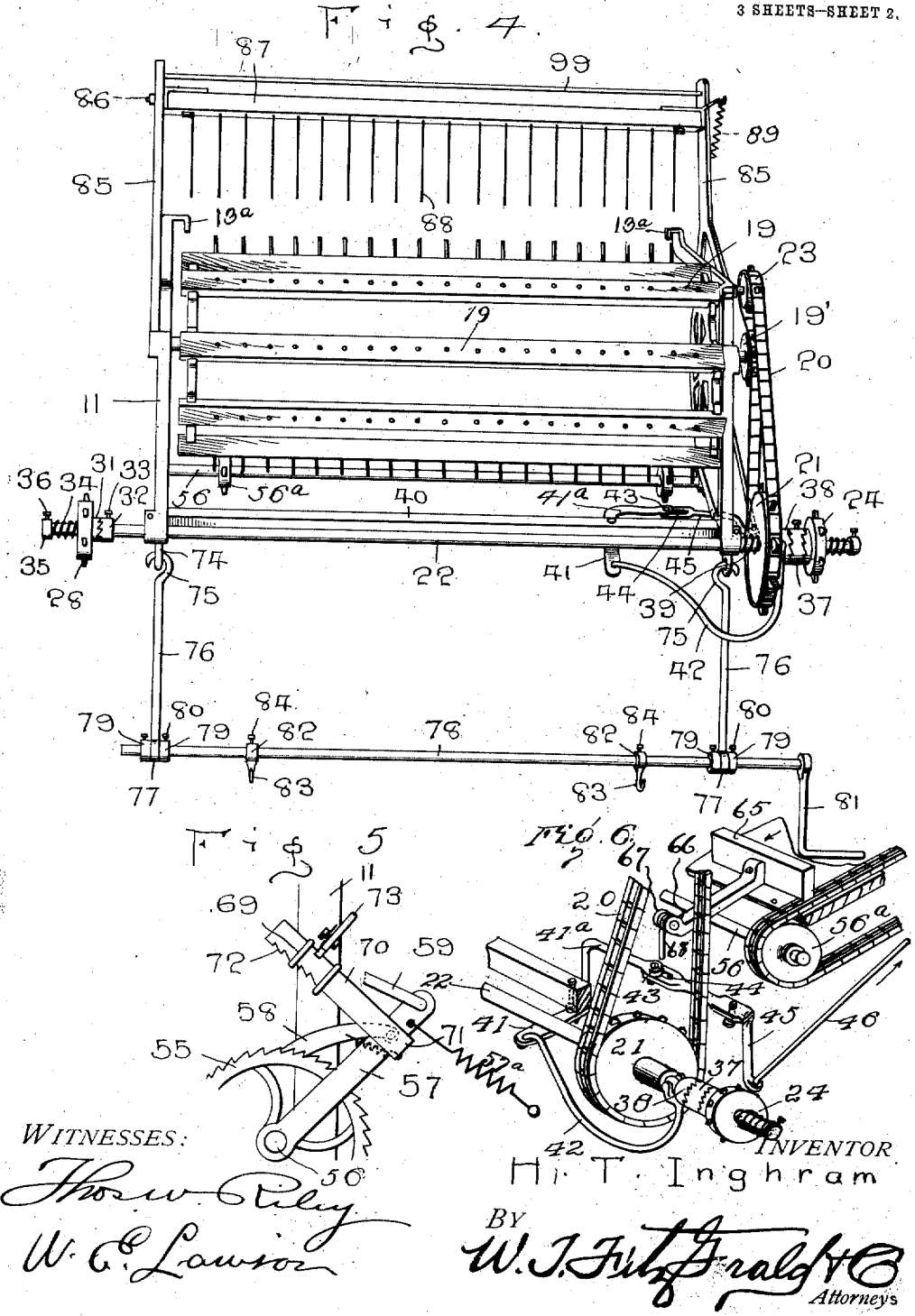

UNITED STATES PATENT OFFICE.

HOWARD T. INGHRAM, OF FAIRFIELD, IOWA.

MANURE-SPREADER.

991,065. Specification of Letters Patent. Patented May 2, 1911.

Application filed May 12, 1908. Serial No. 432,464.

*To all whom it may concern:*

Be it known that I, HOWARD T. INGHRAM, a citizen of the United States, residing at Fairfield, in the county of Jefferson and State of Iowa, have invented certain new and useful Improvements in Manure-Spreaders; and I do hereby declare the following to be a full, clear, and exact description of the invention, such as will enable others skilled in the art to which it appertains to make and use the same.

This invention relates to certain improvements in manure spreaders of that character in which a wagon body is provided with an endless chain conveyer operated from sprocket wheels driven by the wagon wheels, and wherein a beater or revolving toothed wheel is used in connection with the conveyer to comminute and distribute the material.

The main object of my invention is to provide a construction wherein the beater and the conveyer belt shall be operated by means of the supporting wheels of the vehicle and whereby the operation of the beater may be stopped either manually or automatically when the conveyer has arrived at a certain point in its travel.

A further object is to provide means for more thoroughly comminuting or distributing the material by the conveyer, so that it may be distributed in a relatively even condition upon the ground.

A further object is to provide means to permit the vehicle to turn and therefore the opposite wheels of the vehicle to rotate at varying speeds without interrupting the operation of the beater or conveyer shafts or affecting the speeds thereof.

A further object is to provide means for adjusting the speed of travel of the conveyer with relation to the rotation of the beater, and to also provide means whereby the conveyer can be readily removed from the wagon body and rolled upon a suitable receiving shaft where it will be out of the way either when it is desired to use the wagon for other purposes or when it is desired to store the device.

These ends I accomplish by the construction shown in the accompanying drawings, wherein:

Figure 1 is a side elevation of the rear end of the vehicle showing my invention applied thereto. Fig. 2 is a side elevation of the conveyer supporting frame detached from the wagon body. Fig. 3 is a sectional detail view taken on the line 3—3 of Fig. 1. Fig. 4 is a rear elevation of the conveyer and feeder supporting frame with its allied parts detached from the wagon body. Fig. 5 is a fragmentary side elevation showing the means for adjusting the degree of movement of the conveyer operating shaft. Fig. 6 is a detail elevation, enlarged, of the automatic means to cause the conveyer to be thrown into operation. Fig. 7 is a fragmentary top plan of the forward end of the vehicle, showing the discharging conveyer and its sprocket chains. Fig. 8 is a detail view of the tension device for the main operating chain detached. Fig. 9 is a fragmentary elevation of the forward bolster of the vehicle, the wagon body being in section and showing the means for elevating the wagon body. Fig. 10 is a side elevation of one of the side frames employed for supporting the various shafts and gear wheels of my device, parts of the frame being disassembled. Fig. 11 is a fragmentary elevation of the rear bolster and the means for supporting the box thereof, and Fig. 12 is an end view of said box supporting means, the rear bolster being in section.

In the drawings, 1 denotes the box of any suitable vehicle such as is ordinarily employed in farm wagons, said box being supported as usual by front and rear bolsters 2 and 3, these bolsters being, of course, supported on the wheels 4. The box is held in position on the bolsters 2 and 3 by uprights 5, such as are ordinarily employed. Under ordinary circumstances the box of the wagon will rest upon the bolsters in any desired manner, but when it is desired to employ the vehicle as a manure spreader in conjunction with my mechanism, the forward end of the box is elevated by the brackets 6 shown in Fig. 9. These brackets are adapted to rest upon the bolster 2 and are provided at their lower ends with the depending opposed flanges 7 which fit over the bolster and hold the bracket against any transverse movement thereon. This movement is further prevented by ears 8 which engage opposite sides of the uprights 5. The rear end of the body 1 is supported on the brackets 9, shown in Fig. 11, which also have opposed depending flanges 10 engaging with the bolster 3 and which are also provided with ears $10^a$ and $10^b$ which engage with the uprights 5 of the bolster 3. It will be seen that the forward brackets are slightly higher than the rear brackets and that therefore the wagon box is supported on an incline downwardly and rearwardly.

The main portion of the mechanism for supporting and operating the feeder and its attached gears is adapted to be supported upon the rear end of the wagon box and to be removed therefrom. To this end I provide the opposed frames 11 whose form is shown in Figs. 1 and 2. These frames have each the rearwardly extending arm 12 terminating in upwardly extending ends 13. The end of the arm is inwardly bent upon itself, as at 13ª, to form a hook to engage with the upper edge of the body 1 at a point somewhat forward of the rear edge of the body, as shown clearly in Figs. 1 and 3. The frame 11 at its upper edge adjacent the junction with the extended arm 12 is provided with spaced ears 14 between which the end of the diagonal brace rod 15 is received. This end of the brace rod is threaded and provided with a nut 16 whereby the brace rod may be drawn upward to hold the frame in position. The opposite end of the rod 15 is pivotally secured to an ear 17 projecting from the upper side of the bracket 9, as shown in Fig. 12. By this arrangement each of the frames 11 is effectually held from displacement and clamped upon the wagon body. These frames may be readily removed by loosening the nuts 16 and disconnecting the rod 15 from the frames 11, whereupon the frames may be withdrawn rearwardly from the wagon body.

There is a frame 11 at each side of the body 1 and they are similar, except that one of the frames supporting the mechanism for operating the discharge conveyer to be hereinafter described, has a closer approximation to a square than the other frame. Mounted in bearings in the frames 11 is a shaft 18 having fixed thereto a distributing beater 19 composed of opposed wheels fast upon the shaft and cross bars, these cross bars being provided with outwardly projecting teeth. These may be made of any general or preferred construction. One end of the shaft 18 projects beyond one of the frames 11 and has affixed thereto a gear wheel 19′ which is engaged by a sprocket chain 20. This sprocket chain 20 passes around a sprocket wheel 21 loose on a shaft 22 and mounted in the lower outer corners of the frame 11. The chain 20 also passes around an idle gear wheel 23 mounted in the frame 11 above the gear 19′ above referred to. The gear wheel 21 is loosely mounted on an extended portion of the shaft 22 and this extended portion has also loosely mounted thereon a sprocket wheel 24. This is engaged by a sprocket chain 25 which in turn passes around a sprocket 26 removably secured to the spokes 27 of the traction wheel 4. The shaft 22 extends from one frame 11 to the other, and, as before stated, projects at both ends beyond the frames 11. The end of the shaft opposite to that end on which the sprocket wheel 21 is mounted is provided with a loose sprocket wheel 28 precisely similar to the sprocket wheel 24 on the opposite end of the shaft. The wheel 28 is engaged by the sprocket chain 25 which passes around a second large sprocket 30 removably secured to the traction wheel 4. It will thus be seen that the shaft 22 is driven by sprockets on both ends, which sprockets engage with sprocket wheels on the main wheels of the wagon. The wheel 28 has an inwardly projecting hub 31, the inner edge of which is toothed to intermesh with the toothed edge of a collar 32 held fast on the shaft 22 by a set screw 33. The teeth of the extended hub 31 and the collar 32 are ratchet teeth and are inclined so as to engage when the sprocket wheel 28 is rotated in one direction but to permit the sprocket 28 to ride loosely over the collar 32, when the sprocket wheel 28 is rotated in an opposite direction. The teeth of the sprocket wheel 28 are normally held in mesh with the collar 32 by a coiled spring 34 which embraces the shaft 22 and is interposed between the outer faces of the sprocket 28 and the collar 35 held on the outer end portion of the shaft 22 by a set screw 36.

The sprocket wheel 24 is mounted on the shaft 22 in a similar manner to the sprocket 28, and is spring pressed against the collar 37 which is fixed to the shaft and with relation to the sprocket 24, acts like the collar 32, has its inner edge also toothed and this toothed edge acts in conjunction with teeth projecting from a hub 38 on the wheel 21. The sprocket wheel 21 is loose on the shaft 22, and the toothed edge of the hub 38 is held normally in engagement with the teeth of collar 37 by the coiled spring 39 which embraces the shaft 22 and forces the wheel 21 outward. This construction provides that when the hub 38 is in mesh with the sprocket wheel 37 the gear 21 will be revolved with the rotation of the shaft 22 and thereby cause the proper rotation of the conveyer 19. When, however, it is desired to intercept the rotation of the conveyer 19, it is only necessary that the wheel 21 be forced inward against the resiliency of the spring 39. This may be done in any desired manner, although preferably in the manner shown in the drawing.

In order to prevent any undue lateral movement of the frames 11 with relation to the body, the lower ends of said frames are tied together by a cross bar 40. This cross bar also forms the means for pivoting a bell crank lever 41. To one end of the bell crank is pivoted an arm 42 which extends rearward from the sprocket wheel 21 and then upwardly, its end being suitably attached to the hub 38. The opposite end of the crank lever 41 is provided with a pin which passes through a slotted bearing in the end of the lever 45 pivoted intermediate its length to the frame 11. The opposite end of the lever 45 is curved to project forwardly beneath the frame 11, and the lower end of this projecting portion is pivotally attached to a rod 46 which extends longitudinally along the body or box 1 and has its forward end pivotally secured to the lower end of an operating lever 47. This operating lever is pivoted intermediate its length to a bracket 48 secured to the side of the box 1. Stops 49 are carried by the bracket to limit the movement of the lever. It is apparent from the foregoing that by operating the lever 47 the sprocket wheel 21 may be shifted to disconnect it from the driving shaft 22 and that thus the conveyer may be put out of operation.

In order that there may be a proper tension at all times on the sprocket chains 25, each of the frames 11 is provided with eyes 50 through which pass rods 51 terminating at their lower ends each in a curved shoe 52 which is adapted to contact with the under surface of the lower stretch of one of the chains and is held in engagement therewith by a coiled spring 53 embracing the upper end of the rod 51 and interposed between the upper eye 50 and the nut 54 in threaded engagement with the rod 51. Thus the tension of the spring 53 may be varied in order to meet the necessities of practice or service. The structure of the tensioning device is more particularly shown in Fig. 8.

It is particularly pointed out that the provision of the sprockets 24 and 28 which are loosely mounted upon the driving shaft 22 and which have a ratchet toothed engagement with the shaft permits the turning of the vehicle without interfering with the rotation of the shaft 22 or the conveyer, or without causing the slipping of the traction wheels.

Mounted in the lower inner ends of the frames 11 is a shaft 56 which has one projecting end. Affixed to this projecting end is a ratchet wheel 55, and loosely mounted on the shaft is an arm 57 which is provided with a spring-pressed pawl 58 normally in engagement with the ratchet wheel 55. The upper or free end of the arm 57 is pivotally attached to a rod 59 which terminates in a slotted yoke 60. Through this yoke passes a wrist pin 61 of the sprocket wheel 19'. Thus, with each rotation of the sprocket wheel 19', the ratchet wheel will be partially rotated. The arm 57 with its attached parts will be drawn forward after each rearward reciprocation, by the contractile spring 57ª, as shown in detail in Fig. 5. Around the shaft 56 and between the frames 11 passes an endless conveyer 62 adapted to discharge the load of manure contained within the wagon. This conveyer is preferably formed of two suitably spaced sprocket chains engaging sprocket wheels (not shown) affixed to the shaft 56. A portion of the conveyer extends over the bottom of the body or box 1, in proximity thereto, and the forward ends of the conveyer chains pass around sprocket wheels 63 mounted in brackets 64 secured to the forward end of the body. The chains are connected by the transverse blade bars 65. When the ratchet 55 is intermittently rotated by the sprocket 19' the discharge conveyer 62 will be intermittently moved rearward along the bottom of the wagon to carry the manure or other fertilizer toward the conveyer 19.

It has been found desirable in practice that when the conveyer 62, or rather when a blade thereof, has made one complete movement from the front of the wagon to the rear thereof, with relation to the beater 19, that the beater 19 and the conveyer 62 be thrown out of gear, so as to become motionless. To provide for the automatic disconnection of the conveyer and beater one of the blades 65 of the conveyer has projecting horizontally therefrom adjacent to its end an elongated bracket 66 which terminates in an upwardly projecting ear 67 to which is pivoted a finger 68. When passing over the body 1 the finger 68 will be held in a raised or horizontal position, as shown in full lines in Fig. 7, but when it has reached the discharge end of the body and passed the said end, the trigger will fall by gravity to the position shown in Fig. 6, and thus will come in contact with the laterally projecting arm 41ª on the bell crank lever 41 and will push this arm 41ª rearward, thereby operating the bell crank lever to move the sprocket wheel 21 inward and disconnect it from the driving shaft 22. It is also necessary that some means should be provided for regulating the amount of movement of the conveyer relative to the feeder, or, in other words, regulate the speed of the conveyer over the bottom of the wagon body. To this end I have provided one of the frames 11 with the alining eyes or lips 69 through which passes a bar 70. The lower end of this bar 70 is provided with an angular portion 71 which engages with the under edge of the arm 57 and limits its movement in that direction. The lower edge of the opposite end of the bar 70 is toothed, as at 72, and these teeth engage with the eyes 69, being held to this engagement by a latch 73 which is spring-actuated and bears against the rod 70 to force it downward and into engagement with the eyes 69. It is evident that the bar 70 may be adjusted within the eyes 69 to any desired extent and that by adjustment of this bar the throw of the arm 57 upon its forward movement may be limited. This adjustable limitation of the arm 57 permits the speed of travel of the conveyer 62 to be regulated.

In order to provide means for carrying the conveyer belt when not used in conjunction with the wagon body, as, for instance, when the mechanism is to be stored, or when it is desired to use the wagon body without the belt, I provide a belt-supporting means which depends from the side frames of the mechanism, this belt-supporting means having a shaft upon which the conveyer may be wound and carried. In detail the construction is as follows. Each of the frames 11 is provided at its lower end adjacent to the bearings of the shaft 22 with eyes 74 which are engaged by hooks 75 formed on the ends of rods 76. These rods 76 have their other ends provided with eyes 77 in which is rotatably mounted a shaft 78 held from longitudinal movement by collars 79 secured to the shaft by set screws 80. One end of the shaft 78 projects beyond the adjacent rod 76 and to it is affixed a crank 81 by means of which the shaft 78 may be rotated. Upon the shaft are secured collars 82 provided with depending hooks 83, the collars being secured to the shaft by set screws 84. When it is desired to remove the conveyer from the body of the wagon the chains 62 of the conveyer are uncoupled and an end link of each chain is placed in engagement with one of the hooks 83. The crank is then operated and the conveyer chains wound upon the shaft 78. After this operation, the rods 76 may be released from the eyes 74 and the conveyer in its wound-up condition may be stored away until again required. If this is not, desired, however, the conveyer may remain upon the side frames. Projecting upward from each of the frames 11 and suitably secured thereto, as by rivets or nuts, are uprights 85. These uprights are located slightly in advance of the beater 19 and they are slightly inclined toward the beater. The upper portions of the uprights 85 support trunnions 86 forming the ends of a cross bar 87 which has depending resiliently supported fingers 88. These fingers operate in conjunction with the beater 19 and act to prevent any manure being carried around by the beater and again return to the wagon. The fingers are resiliently supported in their position through the medium of a retractile coiled spring 89. Thus they will yield slightly if the material is in any wise entangled in the heater, so that the material may pass the fingers and not stop the operation of the mechanism or tend to break any parts thereof. Ordinarily, however, the fingers clear the blades of the conveyer and prevent the material from being carried back into the wagon. The coiled spring engages one end of a hook 90 projecting from the cross bar 87, and the opposite end of the spring is secured to the frame 85, as shown in Figs. 2 and 5.

The passage of the conveyer chains between the vehicle body and the rear bolster would tend to wear the upper surface of the rear bolster and to prevent this I provide a shield 97 which is suitably affixed to the inner faces of each of the brackets 9. These shields project inwardly across the vertical plane of the chain and over them the chains pass. In order that the shield may be held against displacement, its under surface is recessed at 98, see Fig. 13, to snugly fit the upper portion of the bolster. In order that the uprights 85 may be properly clamped to secure the bar 87 in position, a cross rod 99 is suitably secured at its ends to the frames 86 above the bar 87.

It will be seen that the frames support the beater and the sprocket wheels are entirely removable from the wagon body and may easily be applied to an ordinary wagon body without any change in the construction thereof. This attachment and detachment of the frames is very easily accomplished. It will also be obvious that I have provided means for distributing part of the load at a desired point and then by the operation of the lever 47 throwing the conveyer mechanism out of gear, so that no more of the fertilizer may be distributed until a new portion of the field is reached. Further, I have provided, it will be noted, means for entirely removing the conveyer belt and conveniently carrying and supporting it free from the wagon body and therefore where it will not impede the use of the wagon body for ordinary purposes. Thus, the beater may be operated alone and the material fed to the beater manually. The rotatable supporting shaft, 78, however, permits the conveyer to be easily unwound and again attached to the operating mechanism. Or, the conveyer may be removed bodily and stored, and yet kept in a rolled condition and ready for quick reattachment. This portion of my device is of considerable practicable convenience. Another important feature is that one which provides for the operation of the conveyer even when the wagon is turned. Upon a turning movement of the wagon one of the wheels will move but little and the other of the wheels will rotate considerably. Hence, the necessity of providing some gearing which will allow of a slipping of one wheel relative to the driving shaft and an engagement with the driving shaft by the other wheel. In my construction, no matter how short the turn which is to be made, the feeder and conveyer will continue to operate.

Having thus described my invention, what I claim is:

1. A distributer for wagons having opposed end frames and distributing mechanism supported on said end frames, each of the end frames having a forwardly and upwardly projecting hooked extension adapted to engage over the sides of the wagon body, and each having a pair of projecting lugs, and a clamping rod connected at its lower end to the wagon body and at its upper end engaging between the pair of lugs, said clamping rod having nuts to provide for its adjustment.

2. In a distributer for wagons, opposed side frames, each having an upwardly and forwardly directed hooked extremity adapted to engage over the upper edge of the sides of a wagon body, and each provided with a clamping rod forwardly and downwardly extending and connected at its lower end to the wagon body, a beater shaft rotatably mounted in said side frames, a beater thereon, a conveyer-actuating shaft carried by said frames, a drive shaft mounted in said frames and having a driving sprocket wheel thereon, a loose sprocket wheel mounted on one of said frames, in alinement with the driving sprocket wheel, a sprocket on the beater shaft also in alinement therewith, a sprocket chain connecting the loose sprocket wheel and the driving sprocket wheel and passing over the beater sprocket wheel, loose sprocket wheels on opposite ends of the driving shaft, whereby the driving shaft may be rotated, clutches connecting the driving shaft with said loose sprocket wheels, and means for throwing the driving sprocket wheel out of engagement with the driving shaft.

3. In a distributer for wagons, a conveyer belt, opposed shafts over which the conveyer belt passes, a driving shaft, a loose gear wheel on the driving shaft, connections between said wheel and the conveyer shaft for giving a step-by-step motion to the latter from the former, gear wheels mounted on opposite ends of the driving shaft, means whereby said gear wheels may be rotated from the traction wheels of the wagon, a lever mounted in the path of movement of the conveyer and operating to disconnect the loose gear from the driving shaft thereon when moved in one direction, and a finger pivotally mounted on the conveyer and normally supported thereon in a horizontal position, but adapted to drop downward when the conveyer passes over the rear conveyer shaft and engage with said lever to move it in position to disconnect the driving shaft from the loose gear wheel thereon.

4. In a distributing mechanism for wagons, a beater, a driving shaft, a loose sprocket wheel on the driving shaft, a sprocket chain connecting the loose sprocket wheel with the beater, a hub on the loose sprocket wheel having outwardly projecting ratchet teeth, collars on the opposite ends of the driving shaft, both of said collars on their outer ends being provided with outwardly projecting ratchet teeth, and one of said collars having inwardly projecting ratchet teeth engaging with the ratchet teeth on the hub of the sprocket wheel, gear wheels loosely mounted on the extremities of the shaft having inwardly projecting ratchet teeth engaging with the outwardly projecting teeth of said collars, springs for forcing said gears into engagement with the collars, and means for driving said gear wheels from the traction wheels of the wagon.

5. The combination with a farm wagon having a wagon body and rear traction wheels, said rear traction wheels having sprockets thereon, of a frame attachable to and detachable from the rear end of said wagon body, said frame having distributing mechanism mounted thereon, a driving shaft, a loose driving gear wheel operatively connected to the distributing mechanism, said driving gear wheel being provided with a hub having outwardly projecting ratchet teeth, collars mounted on the extremities of the driving shaft, both of said collars having outwardly projecting ratchet teeth, collars mounted on the extremities of the driving shaft, both of said collars having outwardly projecting ratchet teeth inclined in the same direction with each other, and one of the said collars having inwardly projecting ratchet teeth engageable with the teeth on said hub, a spring for forcing said gear wheel outward to engage its teeth with the teeth on the adjacent collar, shifting mechanism connected to said gear wheel for forcing it into and out of such engagement, loose sprocket wheels mounted on the extremities of the driving shaft and each provided with inwardly projecting ratchet teeth engageable with the outwardly projecting teeth on the collars, springs for forcing said sprocket wheels inward into such engagement, and sprocket chains extending over the loose sprocket wheels and to the sprockets on the rear wheels of the wagon.

6. The combination with a wagon having a wagon box and rear wheels, said wheels being provided with sprocket teeth, of a frame removably attached to the rear end of the wagon box and having mounted thereon a rotatable beater shaft and beater, a conveyer-operating shaft, an endless conveyer whose path of movement traverses the floor of the wagon box, said conveyer having a projecting finger attached thereto, a driving shaft mounted in the frame and having thereon a loose driving sprocket wheel, a sprocket chain passing over the sprocket wheel and engaging with the beater shaft, means for rotating the conveyer shaft by a step-by-step movement from the beater shaft, opposed sprocket wheels on the driving shaft, sprocket chains connecting the sprocket wheels with the sprockets on the traction wheels, ratchet mechanism interlocking the sprocket wheels with the driving shaft upon a movement of the former in one direction, said ratchet mechanism being correspondingly arranged for opposite sprocket wheels, a bell crank lever having one arm mounted in the path of movement of the conveyer and of the finger carried thereby, a connection between the other arm of the bell crank lever and said driving sprocket to shift the same laterally and throw it out of engagement with the driving shaft, an actuating rod connected to said bell crank lever and extending forward and there provided with a hand-operated lever.

7. The combination with a frame attachable to the rear end of the wagon body and projecting out therefrom, and a conveyer belt, and supporting and driving wheels therefor, of an auxiliary shaft supported on the frame rearward of the rear conveyer-supporting wheels and depending below the same and having means whereby it may be attached to said conveyer to permit the winding up of the conveyer thereon, and a crank on said shaft.

8. The combination with a frame attachable to the rear of a wagon body and projecting out therefrom, a conveyer belt, supporting wheels therefor and mechanism for rotating said wheels and operating the belt, of a shaft detachably mounted on the frame and depending below the same rearward of the conveyer supporting wheels, said shaft having a crank at one end and being provided with hooks whereby it may be connected to the conveyer to permit the same to be rolled up thereon.

9. The combination with a frame attachable to the rear end of a wagon body and projecting out therefrom, a conveyer belt, supporting wheels therefor, and means for actuating said conveyer wheels, of rods having detachable hooked engagement at their upper ends with said frame, the lower ends of the rods being formed with eyes, a shaft rotatably mounted in said eyes and having a crank at one end, and hooks fast on said shaft and adapted to engage with said conveyer, whereby the said conveyer may be wound upon the shaft.

In testimony whereof I have signed my name to this specification in the presence of two subscribing witnesses.

HOWARD T. INGHRAM.

Witnesses:
A. D. LONG,
C. E. ROGERS.